May 2, 1933.  B. F. HAWLEY  1,906,750
BRAKE TESTER
Filed July 10, 1930
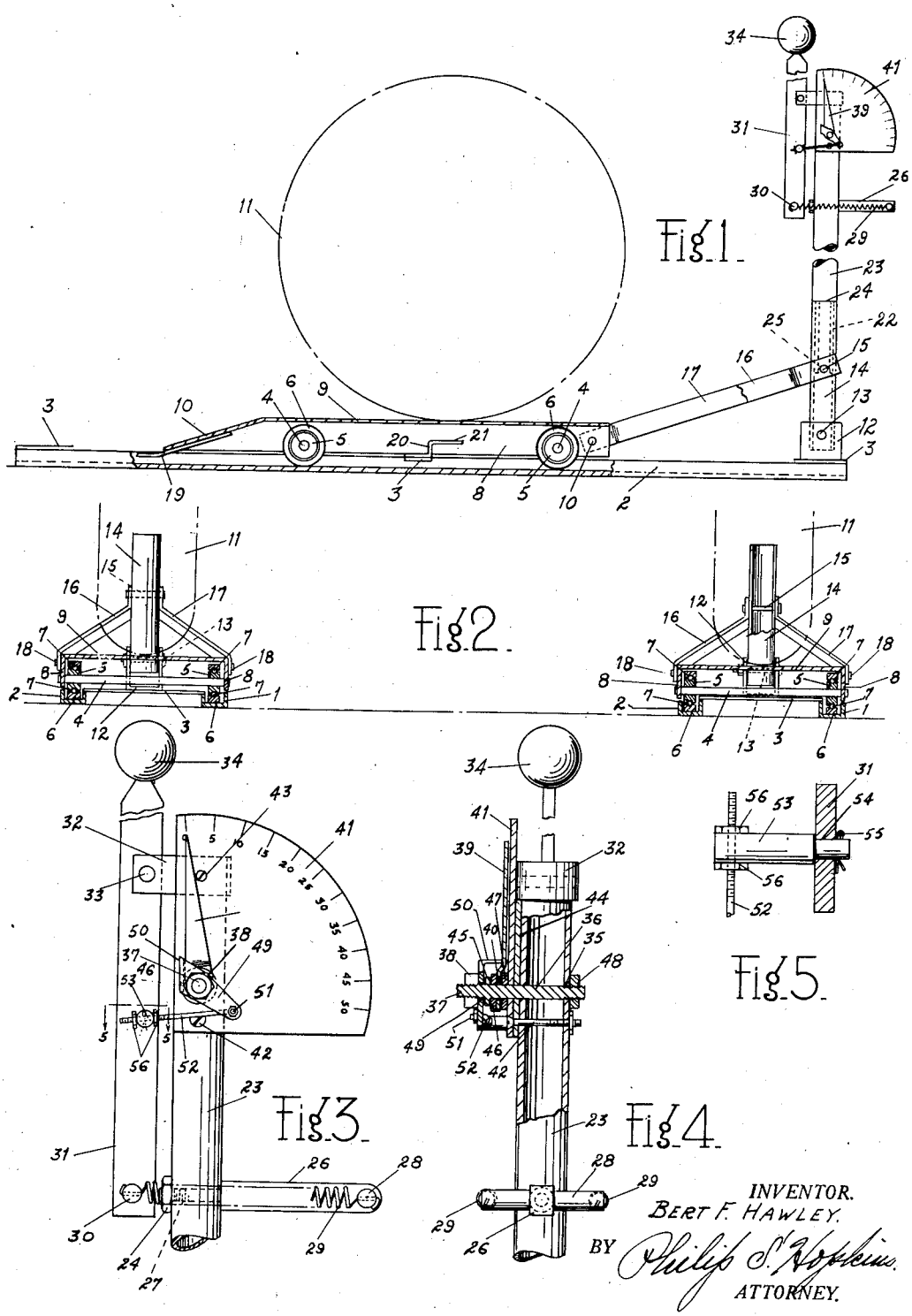
INVENTOR.
BERT F. HAWLEY.
BY
ATTORNEY.

Patented May 2, 1933

1,906,750

UNITED STATES PATENT OFFICE

BERT F. HAWLEY, OF BINGHAMTON, NEW YORK, ASSIGNOR OF FIFTY-ONE PER CENT TO WILLIAM H. HILL, OF JOHNSON CITY, NEW YORK

BRAKE TESTER

Application filed July 10, 1930. Serial No. 466,989.

My invention relates to a brake tester for automobiles, and particularly to means for readily determining the relative adjustment of the brakes on the wheels of an automobile in order that proper adjustments may be made to render them all uniform.

The primary object of my invention is to provide a track unit upon which the front or rear wheels of an automobile may be driven and which by virtue of novel features of construction, permits quick and accurate testing of the brakes and comparison between the adjustments of the brakes on each wheel.

Another object of my invention lies in the provision of a novel gauge or indicator and actuating means therefor, operable to show in advance the relative brake adjustments.

Still another object of my invention is to provide a novel carriage member upon which the wheels of the automobile may be driven, which carriage member when moved to one position, is locked upon the track units and thus prevented from becoming disconnected with such track units.

Other objects and advantages in details of construction and arrangement of parts will be apparent as the description proceeds reference now being had to the figures of the accompanying drawing forming a part of this application and wherein like reference numerals indicate like parts.

In the drawing:—

Figure 1 is a side view partly in section and partly broken away illustrating my invention in operative position.

Figure 2 is a front view of the invention, certain parts being in section for clearness.

Figure 3 is a detail side view of the indicator portion of my invention.

Figure 4 is an edge view thereof, certain parts being in section for clearness.

Figure 5 is a detail view of one of the parts taken on the line 5—5 of Figure 3.

The reference characters 1 and 2 indicate spaced parallel track members formed preferably of channel iron of substantial length to form trackways. There are two sets of these trackways 1 and 2 as shown clearly in Figure 2, one for each of the front or rear wheels of an automobile, the brakes of which are to be tested. As the trackways and the parts associated therewith for operation are identical, the details of but one will be described, the same reference characters being applied to the same parts in each of the track units.

The channel track members 1 and 2 are connected together in spaced parallel relation by means of flat cross straps 3 disposed at the ends of the trackways and preferably at least one intermediate the ends thereof. These straps 3 serve to hold the trackways in definite spaced parallel relation. Shafts 4 extend across between the trackways and secured adjacent the ends of the shafts are ball races 5 around which are rotatably mounted the ring wheels 6 freely rotatable upon balls 7 positioned between the ring wheels 6 and the ball races 5. The shafts 4 are thus movable longitudinally along the trackways 1 and 2 upon the ring wheels 6. The ends of the shafts 4 support the downwardly turned side flanges 8 of a carriage 9 which is, therefore, likewise movable longitudinally along the trackways 1 and 2. The carriage 9 is flat along its upper side except for a downwardly inclined portion 10 adjacent one end thereof terminating at a point almost flush with the upper edges of the track members 1 and 2. The carriage 9, of course, spans the space between the trackways 1 and 2 and by virtue of the inclined portion 10, the wheels of an automobile, indicated in dotted lines in Figures 1 and 2, at 11, may be run upon the carriage 9 and supported therein.

Secured centrally upon one of the cross straps 3 at one end of the trackway is a U-shaped bracket 12 provided with a pivot pin 13 extending between the upstanding side portions thereof and passing through the lower end of a tube or pipe 14 whereby said pipe is pivotally mounted upon said bracket. Passing through the pipe 14 at a point slightly above the pivot pin 13 is a second pivot pin 15, to the outer extending ends of which are pivoted one end of a pair of links 16 and 17 which links diverge outwardly from the pipe 13 and have their opposite ends pivotally secured as at 18 to the side flanges 8 of the carriage 9. Obviously therefore, rocking the pipe 14 on its pivot 13, will result in moving the carriage 9 along the trackways 1 and 2.

Secured to the underside of the inclined portion 10 of the platform carriage 9 is a forward extension 19 lying below the upper edges of the trackways 1 and 2 and adapted, when the carriage is moved to the extreme left in Figure 1, to engage beneath the strap 3. Secured upon the centrally disposed strap 3 is a stop member 20 bent forwardly and horizontally as at 21 in a plane slightly higher than the shaft 4 adjacent the end of the carriage 9. Obviously, therefore, if the pipe 14 is pivoted to the left in Figure 1 whereby to move the carriage 9 to the left, the member 19 carried by the inclined portion 10 of the carriage will engage beneath the strap 3 at that end of the trackways, and the shaft 4 on the opposite end of the carriage will engage with the stop member 20 and be retained against outward movement by the horizontal portion 21 thereof. Thus there is little danger or likelihood of the carriage 9 and its attendant parts becoming detached from the trackways so long as the carriage 9 is moved to the rear or to the left in Figure 1. Likewise, if the trackways should be picked up and leaned against the wall, the carriage 9 would normally roll downwardly to the locking position just described without becoming disengaged from the trackways.

The tubular pipe 14 is adapted to receive through its open upper end the reduced lower end 22 of a pipe section 23 whereby such pipe sections may be telescopically fitted together. The pipe 23 is shouldered as at 24 to limit the downward movement thereof in the pipe 14. The extreme lower end of the reduced portion 22 of the pipe 23 is provided with aligned arcuate recesses shown clearly in dotted lines at 25 in Figure 1. This recessed inner end of the pipe is adapted to fit over and rest upon the pivot pin 15 extending through the pipe 14 and thus prevents turning of the pipe 23 while in such position. This recessed lower end of the pipe 23 also insures the proper positioning of the other elements supported by such pipe and which are about to be described.

Secured to the pipe 23 at a point substantially above the shouldered portion 24 thereof, is an outwardly extending supporting arm 26, the inner end of which is preferably reduced and threaded as indicated in dotted lines in Figure 3 at 27 for threading through suitable openings provided in the pipe 23. A lock nut 24 serves to securely hold the supporting arm 26 rigid on the pipe 23. The outer extending end of the supporting arm 26 is provided with a laterally disposed pin 28 extending to points on either side of the pipe 23. Secured at one end to each of the extending ends of the pin 28 are coil springs 29, the opposite ends of which are secured to the extended ends of a pin 30 fixedly carried at the lower end of a lever 31 and parallel with the pin 28. Obviously, therefore, the lower end of the lever 31 is normally pulled toward the pipe 23 by means of the coil springs 29. The upper end of the pipe 23 is provided with a laterally extending bracket arm 32 provided with a pivot pin 33 upon which is pivotally mounted the lever 31. This lever 31 is provided at its upper extending end with a ball or other hand grip 34 whereby the lever may be rocked upon its pivot 33 against the tension of the springs 29. It will be noted particularly with reference to Figures 3 and 4 that this lever 31 is disposed directly behind and in vertical alignment with the pipe 23. It will be obvious from the construction just described that if the lever 31 is rocked on its pivot 33 to the right in Figures 1 and 3, the pipe 23 and consequently the pipe 14 may also be rocked to the right on the pivot 13, through the agencies consisting of the shaft 33 and the springs 29, the latter, of course, being distended under tension during such rocking movement. The springs 29 are preferably heavy coil springs of considerable resisting power and thus form a resilient operative connection between the lever 31 and the pipe 23.

Threaded through the pipe 23 at a point adjacent its upper end, and as shown clearly at 35 in Figure 4 is a pin 36 extending beyond the pipe and being threaded at its opposite end as at 37 to receive a lock nut 38. A pointer 39 is rotatably mounted upon the pin 36 as at 40. A scale 41 is secured to the pipe 23 by means of the screws 42 and 43, a flat bearing plate 44 (see Figure 4) being interposed between the pipe and the scale 41 and held in position by the same screws. The pin 36 is provided with a flange 45 adjacent its outer end and between this flange 45 and the pointer 39 where it encircles the pin 36, is disposed a friction washer 46. A second friction washer 47 is also disposed around the pin 36 between the pointer 39 and the scale 41. Obviously, the frictional engagement of the pointer 39 upon the pin 36 may be adjusted by means of the threaded pin 36, the lock nut 38 and a lock nut 48 on the inner end of the pin 36. This frictional connection between the pointer 39 and the pin 36 is preferably such that the pointer 39 may be turned on the pin 36 to any desired position and because of the frictional engagement therewith will remain in its adjusted position.

Rotatably mounted upon the pin 36 between the lock nut 38 and the shoulder 45, is a pawl 49, the upper end of which is provided with an inwardly turned finger or flange 50 adapted to engage with one edge of the pointer 39. The opposite end of the pawl has pivotally connected thereto as at 51 one end of a link 52, the opposite end of which is threaded through a pin 53 pivotally mounted upon the lever 31 by means of the reduced circular end 54 thereof passing through the lever and being held against lateral displacement by the cotter pin 55 or other suitable means. Lock nuts 56 are provided on the link 52 on either side of the pin 53, whereby to adjust the link and consequently the position of the pawl 49 with respect to the pointer 39.

The operation of my invention is as follows:—

The normal position of the parts of the device for use in testing the brakes of an automobile is that shown in the figures of the drawing, namely with the carriage 9 moved to the right with the locking elements 19 and 20 free of the strap 3 and shaft 4 respectively, whereby the carriage is freely slidable along the trackways 1 and 2. The pipes 14 and 23 are preferably standing vertically and the lever 31 is also vertical and parallel with the pipe 23, the springs 29 serving to pull such lever normally to such position. The pointer 39 is adjusted to the zero mark on the scale 41 and the pawl 49 is adjusted by the means of the link 52 so that the finger 50 thereof engages the edge of the pointer 39. With the parts in this position and with the front or rear wheels of an automobile resting on the carriages 9, and the brakes for such wheels set by suitable brake jacks or other suitable means, the operator is ready to make the test. The pipe 23 being inserted in one of the pipes 14 with the arcuate end 25 of the pipe 23 engaging the pivot pin 15, the lever 31 will be directly behind and in alignment with the pipe 23, and the pipe 23 and the scale 41 will be held against turning within the pipe 14 and therefore in readily observable position. The operator now pulls to the right in Figure 1 upon the lever 31 thus rocking the lever 31 on its pivot 33 and tensioning the springs 29. When the resistance offered by the brake of the wheel 11 being tested, is overcome by the pull on the lever 31 and consequently upon the pipe 14 through the springs 29 and pipe 23, the wheel 11 will, of course, rotate due to its frictional engagement upon the cariage 9. It will be obvious, of course, that as the lever 31 is rocked on its pivot, the pawl 49 through the link 52, will be rotated upon the pin 36 and during such rotation will move the pointer 39 over the scale 41. Such pointer will of course, remain in its furthest pulled position on the scale by virtue of its frictional connections with the pin 36. Obviously, therefore, when the resistance of the brake on the wheel 11 is overcome by the pull exerted through the lever 31, springs 29 pipe 23, pipe 14 and links 16 and 17 connected to the carriage 9, the wheel will rotate and there will be recorded upon the scale 41 the amount of resistance offered to the leverage action thus placed upon the wheel. It will be understood, of course that the scale 41 may be graduated in pounds or any empirical units of resistance measurement.

Having noted the resistance offered by the brake on this particular wheel being tested, the operator simply lifts the pipe 23 and its attendant parts from the pipe 14 and inserts it in the similar pipe 14 on the other track unit upon which the opposite wheel of the automobile is resting. The pointer 39 is manually returned to zero position and the same operation repeated. Thus, the operator is able to determine quickly and easily whether the brakes on the two wheels being tested on the trackways are adjusted to the same degree or whether an adjustment on one is necessary in order to make them both uniform. The readings on the scale 41 indicate variations in brake adjustment.

Of course, if desired, one of the pipes 23 with the attendant operating lever, scale, springs, pointer, etc. can be provided in each of the pipes 14 for each track unit, preferably however but one such device is used, being first inserted in one unit and then in the other.

Of course, changes may be made in details of construction without departing from the spirit and scope of my invention. I do not limit myself, therefore, to the exact form herein shown and described other than by the appended claims.

I claim:

1. A brake tester comprising a trackway, a carriage movable in said trackway and adapted to support an automobile wheel, a hollow member pivoted to said trackway, connecting means pivoted to said member and said carriage, and means removably mounted in said member for rocking the same on its pivot to move said carriage, said means having a force measuring device thereon operative to register the resistance offered to the movement of said carriage by the wheel thereon.

2. A brake tester comprising a trackway, a carriage movable therein and adapted to support an automobile wheel, a hollow member pivoted to said trackway, connecting means pivoted to said member and said carriage, a second member removably mounted in said first member for rocking the same on its pivot to move said carriage, and means for so operating said members comprising a lever pivoted to said second member, a spring connecting said lever and said second member, said second member having an indicator thereon operative by said lever to register the resistance offered to the movement of said carriage by the wheel thereon.

3. A brake tester comprising a trackway, a carriage movable therein and adapted to support an automobile wheel, a hollow member pivoted to said trackway, connecting means pivoted to said member and said carriage, a second member removably mounted in said first member for rocking the same on its pivot to move said carriage, and means for so operating said members comprising a lever pivoted to said second member, a spring connecting said lever and said second member, said second member having an indicator thereon operative by said lever to register the resistance offered to the movement of said carriage by the wheel thereon, said indicator comprising a dial fixed to said second member and a pointer cooperating therewith, and means operable by the movement of said lever for moving said pointer over said dial, and frictional means for retaining said pointer in adjusted position, and means for adjusting the operative connection between said lever and said pointer.

4. A brake tester comprising a trackway, a carriage movable in said trackway and adapted to support an automobile wheel, a hollow member pivoted to said trackway, connecting means pivoted to said member and said carriage, and means removably mounted in said member for rocking the same on its pivot to move said carriage, said means having a force measuring device thereon operative to register the resistance offered to the movement of said carriage by the wheel thereon, said means being slidably and non-rotatably mounted in said member.

5. A brake tester comprising a trackway, a carriage movable therein and adapted to support an automobile wheel, a hollow member pivoted to said trackway, connecting means pivoted to said member and said carriage, a second member removably mounted in said hollow member and being slidable and non-rotatable therein, means for pivotally rocking said members to move said carriage comprising a lever pivoted intermediate its ends to said second member, a spring connection between one end of said lever and said second member, a dial and pointer carried by said second member, and means operable by the movement of said lever for moving said pointer over said dial to register the resistance offered to the movement of said carriage by the wheel thereon.

6. A brake tester comprising a trackway, a carriage movable therein and adapted to support an automobile wheel, a hollow member pivoted to said trackway, connecting means pivoted to said member and said carriage, a second member removably mounted in said hollow member and being slidable and non-rotatable therein, means for pivotally rocking said members to move said carriage comprising a lever pivoted intermediate its ends to said second member, a spring connection between one end of said lever and said second member, a dial and pointer carried by said second member, and means operable by the movement of said lever for moving said pointer over said dial to register the resistance offered to the movement of said carriage by the wheel thereon, said pointer moving means comprising a pawl engaging said pointer, and means for adjusting said pawl with respect to said lever and pointer.

7. A brake tester comprising a trackway, a carriage movable in said trackway and adapted to support an automobile wheel, a member pivoted to said trackway, connecting means pivoted to said member and said carriage for moving the same, a force measuring device supported by said member operative to register the resistance offered to the movement of said carriage by the wheel thereon, and means on said trackway cooperating with said carriage to prevent disengagement therebetween in certain positions.

8. A brake tester comprising a trackway, a carriage movable in said trackway and adapted to support an automobile wheel, a member pivoted to said trackway, connecting means pivoted to said member and said carriage for moving the same, a force measuring device on said member operative to register the resistance offered to the movement of said carriage by the wheel thereon, and means on said trackway cooperating with said carriage to prevent disengagement therebetween, said means comprising locking devices on said trackway engageable by parts of said carriage in one position thereof.

9. A brake tester comprising a pair of trackways, carriages movable in said trackways and adapted to support automobile wheels, members pivoted to each of said trackways, connecting means pivoted to said member and the carriage, and means adapted for selective removable engagement with either of said members for rocking the same on its pivot to move the carriage connected therewith, said means having a force measuring device thereon operative to register the resistance offered to the movement of each carriage by the wheel thereon.

In testimony whereof, I affix my signature.

BERT F. HAWLEY.